(12) United States Patent  (10) Patent No.: US 11,614,590 B2
Kang et al. (45) Date of Patent: Mar. 28, 2023

(54) MICROLENS ARRAY WITH FIRST SIDE THEREOF HAVING ASPHERIC-SURFACE SHAPES

(71) Applicant: MPNICS CO., LTD., Gwangju (KR)

(72) Inventors: Sang Do Kang, Gwangju (KR); Seung Keun Oh, Gwangju (KR)

(73) Assignee: MPNICS CO., LTD., Gwangju (KR)

( * ) Notice: Subject to any disclaimer, the term of this patent is extended or adjusted under 35 U.S.C. 154(b) by 14 days.

(21) Appl. No.: 17/361,764

(22) Filed: Jun. 29, 2021

(65) Prior Publication Data

US 2022/0179158 A1 Jun. 9, 2022

(30) Foreign Application Priority Data

Dec. 9, 2020 (KR) .................. 10-2020-0171648

(51) Int. Cl.
*G02B 6/42* (2006.01)
*G02B 3/02* (2006.01)
(52) U.S. Cl.
CPC ............. *G02B 6/4206* (2013.01); *G02B 3/02* (2013.01); *G02B 6/4215* (2013.01)
(58) Field of Classification Search
CPC ...... G02B 6/4206; G02B 3/02; G02B 6/4215; G02B 19/0014; G02B 19/0057; G02B 3/04; G02B 3/005; G02B 3/0087
See application file for complete search history.

(56) References Cited

U.S. PATENT DOCUMENTS

2020/0363595 A1\* 11/2020 Grann .................. G02B 6/4292

FOREIGN PATENT DOCUMENTS

KR 10-2009-0029565 A 3/2009
KR 10-2011-0026368 A 3/2011

OTHER PUBLICATIONS

Office action dated Jul. 6, 2022 from Korean Patent Office in a counterpart Korean Patent Application No. 10-2020-0171648 (English translation is also submitted herewith.).

\* cited by examiner

*Primary Examiner* — John Bedtelyon
(74) *Attorney, Agent, or Firm* — The PL Law Group, PLLC (57) ABSTRACT

A microlens array according to an embodiment of the present disclosure includes lens layers with a first side thereof having aspheric-surface shapes. The microlens array is configured such that an optical communication module may be miniaturized and integrated as a working distance (WD) is minimized to 1.30±0.05 mm, and collimating performance is excellent as a curvature radius (R1) of each lens layer is 1.1 to 1.5.

4 Claims, 7 Drawing Sheets

| material (material) | refractive index (n) | working distance (WD; mm) | curvature radius of first lens (R1) | divergence angle (Divergence angle; mrad) |
|---|---|---|---|---|
| K-BK7(SUMITA) | 1.51633 | 1.300 | 0.892 | 1.120 |
| K-VC78(SUMITA) | 1.66955 | | 1.127 | 0.908 |
| K-VC82(SUMITA) | 1.756 | | 1.251 | 0.912 |
| K-LAFK50(SUMITA) | 1.772 | | 1.280 | 0.914 |
| L-LAH84(OHARA) | 1.810 | | 1.328 | 0.920 |
| L-TIH53(OHARA) | 1.847 | | 1.363 | 0.920 |
| K-VC90(SUMITA) | 1.853 | | 1.392 | 0.920 |
| L-LAH83(OHARA) | 1.864 | | 1.410 | 0.922 |

| wavelength (WL; nm) | L-LAH84 (OHARA) refractive index: 1.810 | K-BK7 (SUMITA) refractive index: 1.516 | K-VC78 (SUMITA) refractive index: 1.670 | K-VC82 (SUMITA) refractive index: 1.756 | K-LAFK50 (SUMITA) refractive index: 1.772 | L-TIH53 (OHARA) refractive index: 1.847 | K-VC90 (SUMITA) refractive index: 1.853 | L-LAH83 (OHARA) refractive index: 1.864 |
|---|---|---|---|---|---|---|---|---|
| 850 | 1.020 | 1.208 | 1.124 | 1.100 | 1.114 | 1.098 | 1.114 | 1.106 |
| 1100 | 1.020 | 1.196 | 1.014 | 1.090 | 1.110 | 1.134 | 1.096 | 1.090 |
| 1290 | 0.952 | 1.190 | 0.906 | 0.906 | 0.910 | 0.924 | 0.922 | 0.928 |
| 1310 | 0.920 | 1.186 | 0.908 | 0.912 | 0.914 | 0.920 | 0.920 | 0.922 |
| 1380 | 0.916 | 1.174 | 0.912 | 0.926 | 0.908 | 0.924 | 0.928 | 0.922 |
| 1425 | 0.900 | 1.178 | 0.906 | 0.912 | 0.922 | 0.920 | 0.926 | 0.930 |
| 1470 | 0.914 | 1.168 | 0.916 | 0.918 | 0.914 | 0.928 | 0.932 | 0.932 |
| 1515 | 0.906 | 1.178 | 0.910 | 0.922 | 0.924 | 0.928 | 0.938 | 0.934 |
| 1550 | 0.916 | 1.174 | 0.916 | 0.932 | 0.932 | 0.928 | 0.938 | 0.930 |
| 1610 | 0.906 | 1.154 | 0.918 | 0.928 | 0.932 | 0.944 | 0.936 | 0.916 | divergence angle (Divergence angle; mrad)

FIG. 7

MICROLENS ARRAY WITH FIRST SIDE THEREOF HAVING ASPHERIC-SURFACE SHAPES

CROSS REFERENCE TO RELATED APPLICATION

The present application claims priority to Korean Patent Application No. 10-2020-0171648, filed Dec. 9, 2020, the entire contents of which is incorporated herein for all purposes by this reference.

BACKGROUND

1. Field of the Invention

The present invention relates to a microlens array and, more particularly, to a microlens array with a first side thereof having aspheric-surface shapes, wherein an optical communication module may be miniaturized and integrated as a working distance WD is minimized to 1.30±0.05 mm, and collimating performance is excellent as each lens layer has a curvature radius R1 of 1.1 to 1.5.

2. Description of the Related Art

In general, optical communication modules widely uses a method of transmitting optical signals of different wavelengths through a single optical fiber by using wavelength division multiplexing (WDM) in order to increase transmission capacity.

Figure 1:
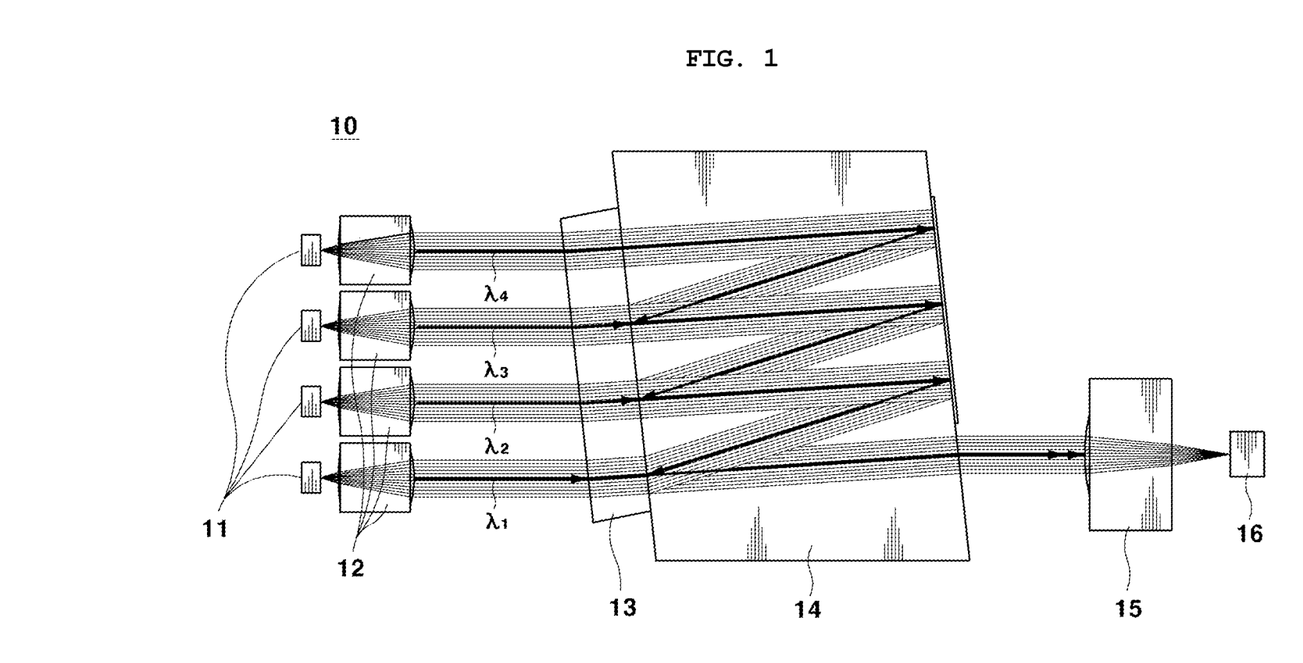
FIG. 1 is a view showing an optical communication module to which a conventional microlens array is applied.

FIG. 1 is a view showing an optical communication module 10 to which a conventional microlens array is applied.

Referring to FIG. 1, a conventional optical communication module 10 includes: a light source 11; a microlens array 12 for functioning as a collimating lens and provided with a plurality of lens layers integrally formed therein, the lens layers respectively having aspheric-surface shapes; a filter 13 for selectively transmitting only a specific wavelength of a beam incident through the microlens array; an optical block 14 for reflecting beams of different wavelengths $\lambda 1$, $\lambda 2$, $\lambda 3$, and $\lambda 4$ incident through the filter 13 to be merged with each other; and a microlens 15 for functioning as a focusing lens that receives the merged multi-wavelength beams to be focused into a fiber 16.

Figure 2:
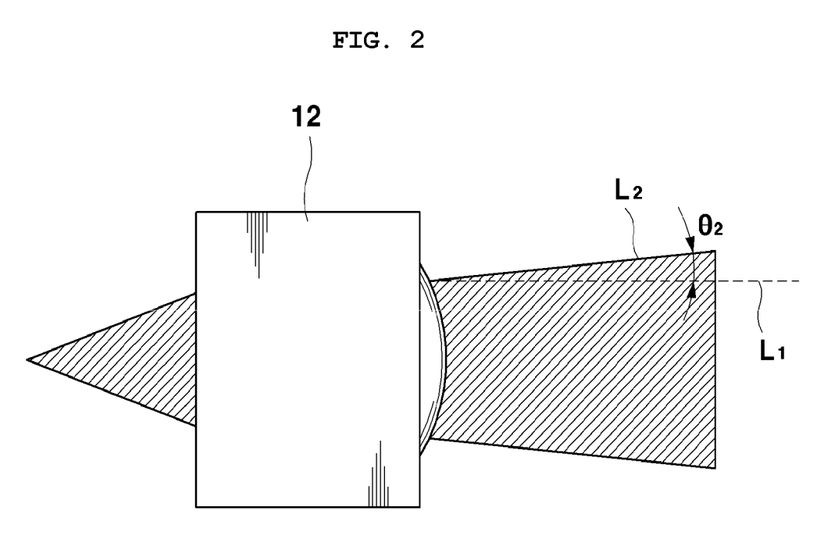
FIG. 2 is a view showing a beam divergence angle of the microlens array.

Meanwhile, FIG. 2 is a view showing a beam divergence angle of the microlens array 12, and referring to FIG. 2, the beam divergence angle refers to an angle $\theta 2$ formed by a line L1 parallel to an optical axis and a diffusion line L2 of a beam.

In the conventional optical communication module 10, a beam path of a first wavelength $\lambda 1$ is about 80 mm, and a beam path of a fourth wavelength $\lambda 4$ is about 200 mm, and in order to reduce light loss and achieve high performance, a divergence angle of collimation beam should be small.

In more detail, when a beam path is 140 mm or more as a result of module simulation of a lens designed with a beam divergence angle of 1 mrad or more, loss of optical signals occurs, so it is confirmed that performance drops sharply to 60% or less, and thus in order to exhibit 90% or more of the performance even when the beam path is 200 mm, there is a need to develop a microlens array with the beam divergence angle of 1 mrad or less.

In addition, with the development of an optical communication industry, in order to miniaturize and integrate optical communication modules, it is necessary to develop a microlens array that satisfies the beam divergence angle of 1 mrad or less, while minimizing the working distance WD, which is a distance between the microlens and a light source.

SUMMARY

The present invention has been devised to solve the above-described problems, and an objective of the present invention is to provide a microlens array in which an optical communication module may be miniaturized and integrated as a working distance WD is minimized, and collimating performance is excellent as a beam divergence angle is 1 mrad or less.

The objective of the present invention is not limited to the objective mentioned above, and other objectives not mentioned herein will be clearly understood from the following description.

In order to achieve the above-described objective, the present invention provides a microlens array including: a plurality of lens layers with a first side thereof having aspheric-surface shapes, wherein a working distance WD is 1.30±0.05 mm, each lens layer has a curvature radius R1 of 1.1 to 1.5, and a beam divergence angle is less than 1 mrad.

In a preferred exemplary embodiment, the microlens array may have a refractive index Nd of 1.60 to 1.86.

In the preferred exemplary embodiment, the microlens array may be used in a wavelength range of 1290 nm to 1610 nm.

In the preferred exemplary embodiment, the microlens array may have a numerical aperture object NAO of 0.177 or less.

In the preferred exemplary embodiment, the microlens array may have a thickness of 0.690 mm to 0.730 mm and a beam diameter BD of 0.60 mm or less.

In addition, the present invention further provides an optical communication module including: a light source; a microlens array for functioning as a collimating lens; a filter for selectively transmitting only a specific wavelength of a beam incident through the microlens array; an optical block for reflecting beams of different wavelengths incident through the filter to be merged with each other; and a microlens for functioning as a focusing lens that receives the merged multi-wavelength beams to be focused into a fiber.

The present invention has the following excellent effects.

According to the microlens array of the present invention, a plurality of lens layers each having an aspheric-surface shape is provided on a first side of the microlens array, wherein the optical communication module may be miniaturized and integrated as the working distance WD is minimized to 1.30±0.05 mm, the curvature radius R1 of each lens layer is 1.1 to 1.5, the refractive index Nd is 1.60 to 1.86, the wavelength range of 1290 nm to 1610 nm is available, and the beam divergence angle is 1 mrad or less, thereby having an effect in that 90% or more of collimating performance may be exhibited even when the beam path is 200 mm.

DETAILED DESCRIPTION

The terms used in the present invention have been selected as much as possible from general terms that are widely used, but in certain cases, there also exists terms that are arbitrarily selected by the applicant. In this case, the meaning should be interpreted by taking into considering the meanings of the terms described or used in the detailed description of the present invention, rather than just by using the names of terms.

Hereinafter, a technical configuration of the present invention will be described in detail with reference to preferred exemplary embodiments illustrated in the accompanying drawings.

However, the present invention is not limited to the exemplary embodiment described herein and may be embodied in other forms. The same reference numerals throughout the specification indicate the same components.

Figure 3:
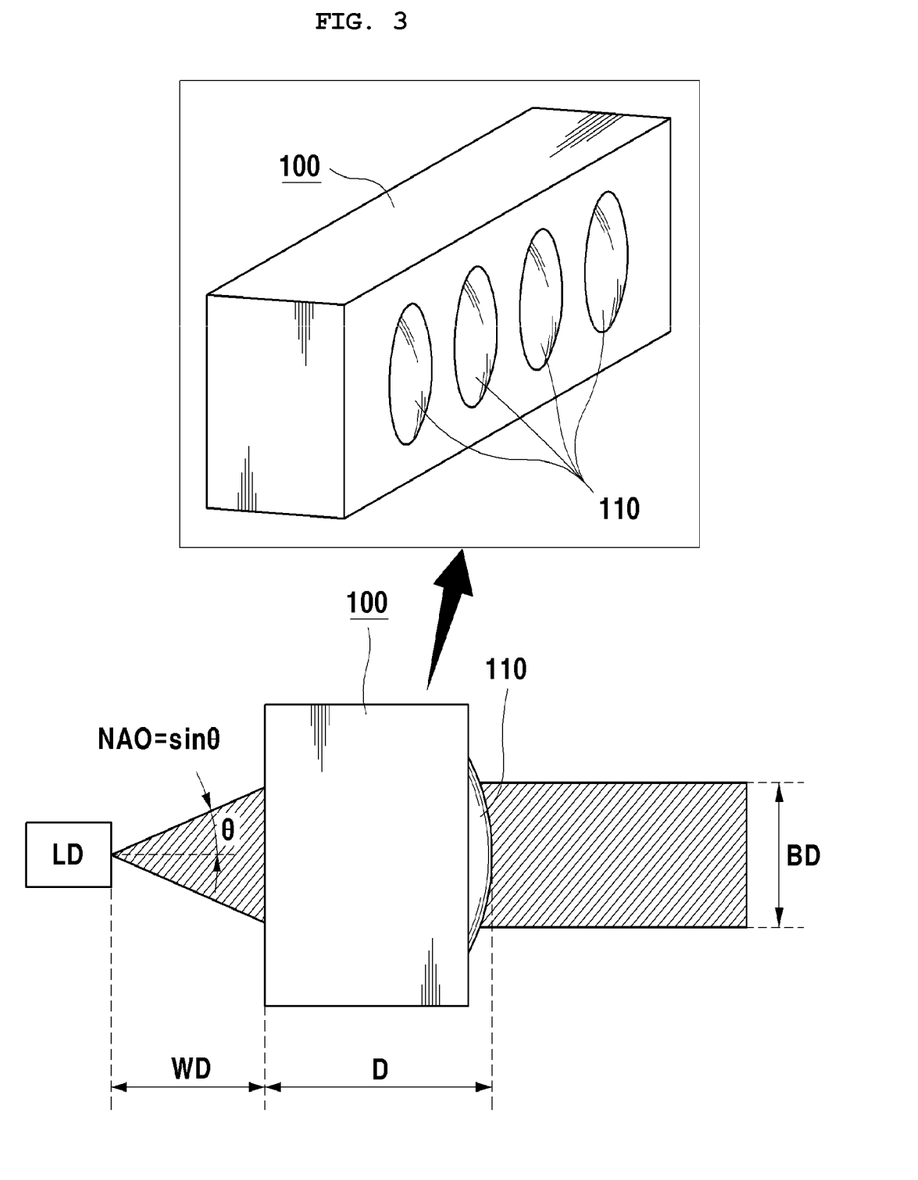
FIG. 3 is a view showing a microlens array according to an exemplary embodiment of the present invention.

FIG. 3 is a view showing a microlens array according to the exemplary embodiment of the present invention.

Referring to FIG. 3, the microlens array 100 according to the exemplary embodiment of the present invention is a microlens array that functions as a collimating lens or a focusing lens, and a plurality of lens layers 110 each having an aspheric-surface shape is provided on a first side thereof.

Here, the lens layers 110 are integrally formed as a single body, and are disposed at equal intervals apart from each other.

In addition, the working distance WD of the microlens array 100 satisfies 1.30±0.05 mm.

In this way, the working distance is minimized, so that the diameter of a beam is reduced, thereby enabling miniaturization and integration of the optical communication module.

In addition, it is preferable that the microlens array 100 has a curvature radius R1 of each lens layer 110 of 1.1 to 1.5.

In addition, each of the lens layers 110 may have the same curvature radius R1 with each other.

In addition, it is preferable that the microlens array 100 has a refractive index Nd of 1.60 to 1.86.

In this way, the microlens array 100 has the value of curvature radius of each lens layer of 1.1 to 1.5 and the refractive index Nd of 1.60 to 1.86, so that the beam divergence angle is formed to be 1 mrad or less, thereby having an advantage of exhibiting 90% or more of collimating performance even when the beam path is 200 mm.

In this case, the microlens array 100 may be used in a wavelength range of 1290 nm to 1610 nm.

In addition, the microlens array 100 is provided to have a numerical aperture object NAO of 0.177 or less, a thickness D of 0.690 mm to 0.730 mm, and a beam diameter BD of 0.60 mm or less.

Here, the numerical aperture object NAO is calculated as $\sin\theta$, where $\theta$ refers to an angle formed by a line parallel to an optical axis and a diffusion line of a light source LD.

Figure 4:
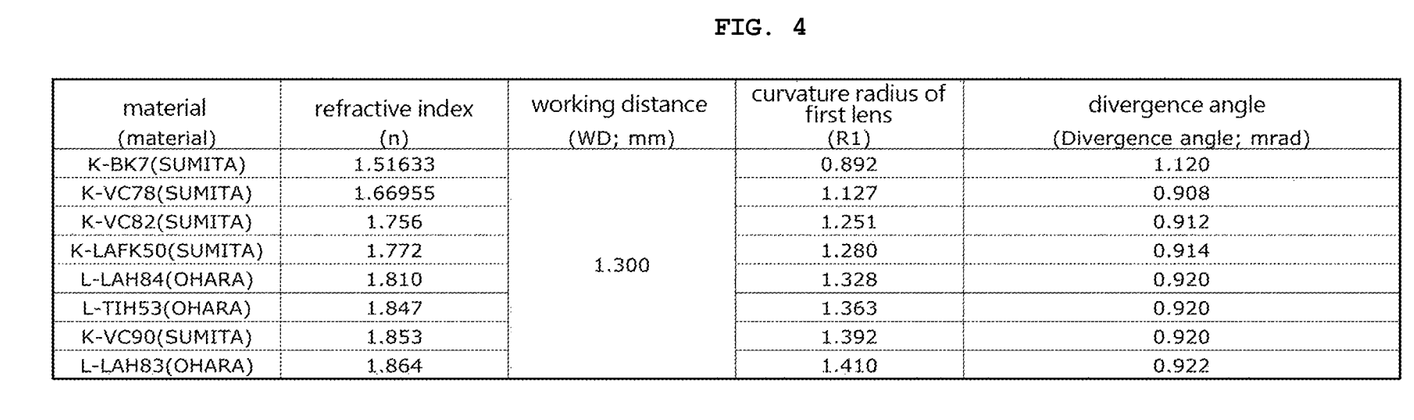
FIG. 4 is a view showing a result of analyzing collimating performance (i.e., beam divergence angle) according to a refractive index and a curvature radius ratio of the microlens array according to the present invention.
Figure 5:
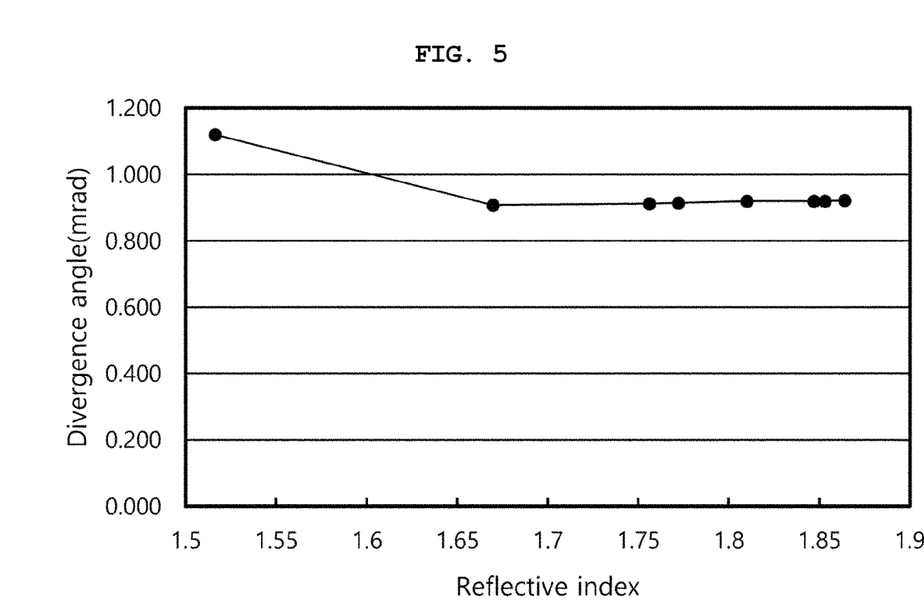
FIG. 5 is a view showing a graph analyzing the collimating performance (i.e., beam divergence angle) according to the refractive index of the microlens array according to the present invention.

FIGS. 4 and 5 are views showing results of analyzing the collimating performance (i.e., beam divergence angle) according to the refractive index and curvature radius ratio of the microlens array according to the present invention.

Referring to FIGS. 4 and 5, as a result of checking a divergence angle of a beam by fixing a working distance WD to 1.30 mm and making a microlens with various materials (i.e., K-BK7(SUMITA), K-VC78(SUMITA), K-VC82(SUMITA), K-LAFK50(SUMITA), K-VC89 (SUMITA), L-TIH53(OHARA), K-VC90(SUMITA), L-LAH83(OHARA)) with a refractive index of 1.51633 to 1.864, it is confirmed that the divergence angle of the beam is less than 1 mrad when the refractive index was 1.60 to 1.86.

In addition, when the value of the curvature radius of each lens layer 110 is 1.1 to 1.5, it is confirmed that the divergence angle of the beam is less than 1 mrad.

Figure 6:
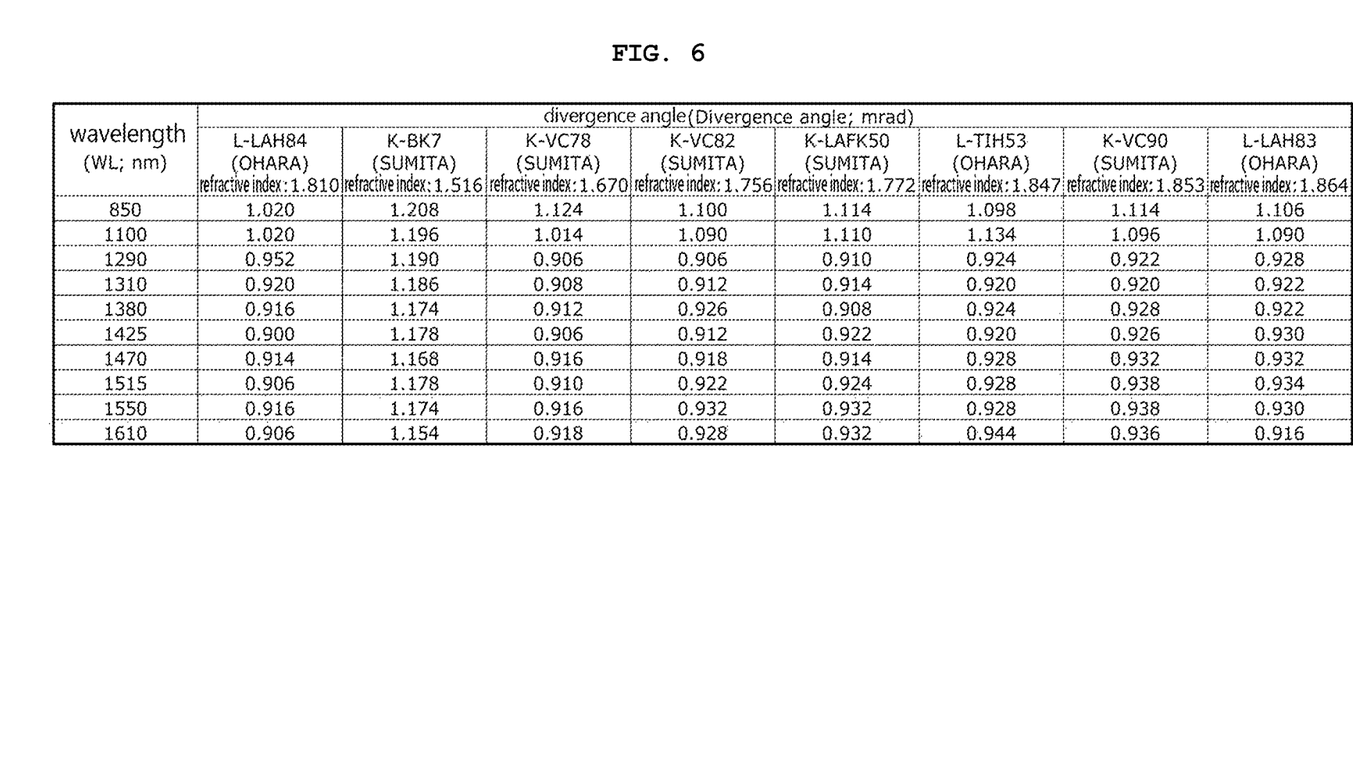
FIG. 6 is a view showing a result of analyzing the collimating performance (i.e., beam divergence angle) according to a wavelength of the microlens array according to the present invention.
Figure 7:
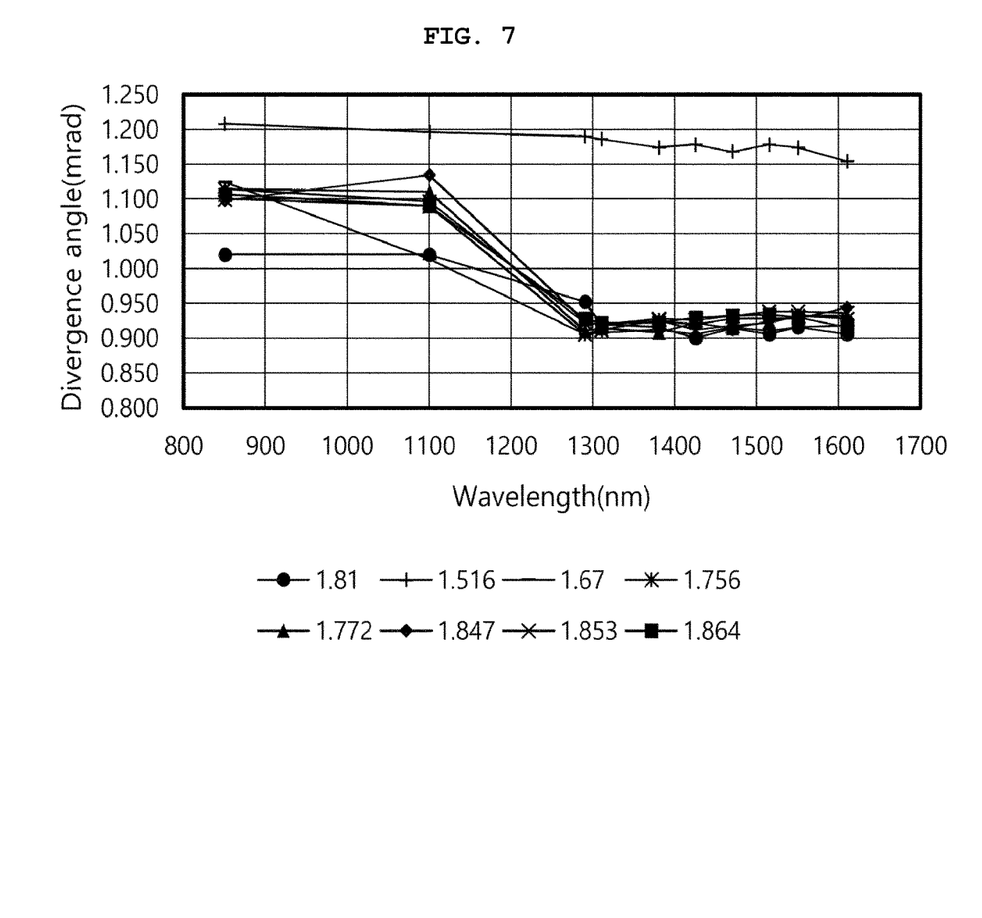
FIG. 7 is a view showing a graph analyzing the collimating performance (i.e., beam divergence angle) according to the wavelength of the microlens array according to the present invention.

FIGS. 6 and 7 are views showing results of analyzing the collimating performance (i.e., beam divergence angle) according to the wavelength of the microlens array according to the present invention.

Referring to FIGS. 6 and 7, as a result of checking a divergence angle of a beam by fixing the working distance WD to 1.30 mm and making a microlens with various materials (i.e., K-BK7(SUMITA), K-VC78(SUMITA), K-VC82(SUMITA), K-LAFK50(SUMITA), K-VC89 (SUMITA), L-TIH53(OHARA), K-VC90(SUMITA), L-LAH83(OHARA)) with a refractive index of 1.51633 to 1.864, it is confirmed that the divergence angle of the beam is formed to have less than 1 mrad in the wavelength range of 1290 nm to 1610 nm to which the optical communication module is applied.

In addition, the present invention may be provided as an optical communication module including the microlens array 100 according to the present invention.

The optical communication module includes: a plurality of light sources, a microlens array, a filter, an optical block, and a microlens.

Here, the light sources serve to generate beams of different wavelengths, the microlens array functions as a collimating lens for collimating the beams generated from the light sources, and the filter selectively transmits only a specific wavelength of beams incident through the microlens array.

In addition, the optical block causes the beams of different wavelengths incident through the filter to be reflected and merged with each other, and the microlens functions as a focusing lens that receives the beams of multiple wavelengths merged through the optical block and focuses the beams into the fiber.

As described above, in the microlens array 100 with a first side thereof having aspheric-surface shapes according to the present invention, a plurality of lens layers each having an aspheric-surface shape is formed integrally and provided on a first side thereof, wherein the optical communication module may be miniaturized and integrated as the working distance WD is minimized to 1.30±0.05 mm, the curvature radius R1 of each lens layer is 1.1 to 1.5, the refractive index Nd is 1.60 to 1.86, the wavelength range of 1290 nm to 1610 nm is available, and the beam divergence angle is 1 mrad or less, thereby having an effect in that 90% or more of collimating performance may be exhibited even when the beam path is 200 mm.

As described above, the present invention has been illustrated and described with reference to the preferred exemplary embodiment, but is not limited to the above-described exemplary embodiment, and various changes and modifications can be embodied by those skilled in the art to which the present invention belongs without departing from the spirit of the present invention.

What is claimed is:

1. A microlens array comprising:
a plurality of lens layers with a first side thereof having aspheric-surface shapes, wherein a working distance (WD) is 1.30±0.05 mm;
each lens layer has a curvature radius (R1) of 1.1 to 1.5 mm; and
a beam divergence angle is less than 1 mrad,
wherein the microlens array has a refractive index (Nd) of 1.60 to 1.86; and
the microlens array is used in a wavelength range of 1290 nm to 1610 nm.

2. The microlens array of claim 1, wherein the microlens array has a numerical aperture object (NAO) of 0.177 or less.

3. The microlens array of claim 1, wherein the microlens array has a thickness of 0.690 mm to 0.730 mm and a beam diameter (BD) of 0.60 mm or less.

4. An optical communication module comprising:
a light source;
the microlens array of claim 1, the microlens array functioning as a collimating lens;
a filter for selectively transmitting only a specific wavelength of a beam incident through the microlens array;
an optical block for reflecting beams of different wavelengths incident through the filter to be merged with each other; and
a microlens for functioning as a focusing lens that receives the merged multi-wavelength beams to be focused into a fiber.

* * * * *